No. 730,930. PATENTED JUNE 16, 1903.
J. W. LAMBERT.
TRANSMISSION GEAR FOR AUTOMOBILES.
APPLICATION FILED OCT. 9, 1902.
NO MODEL. 2 SHEETS—SHEET 1.
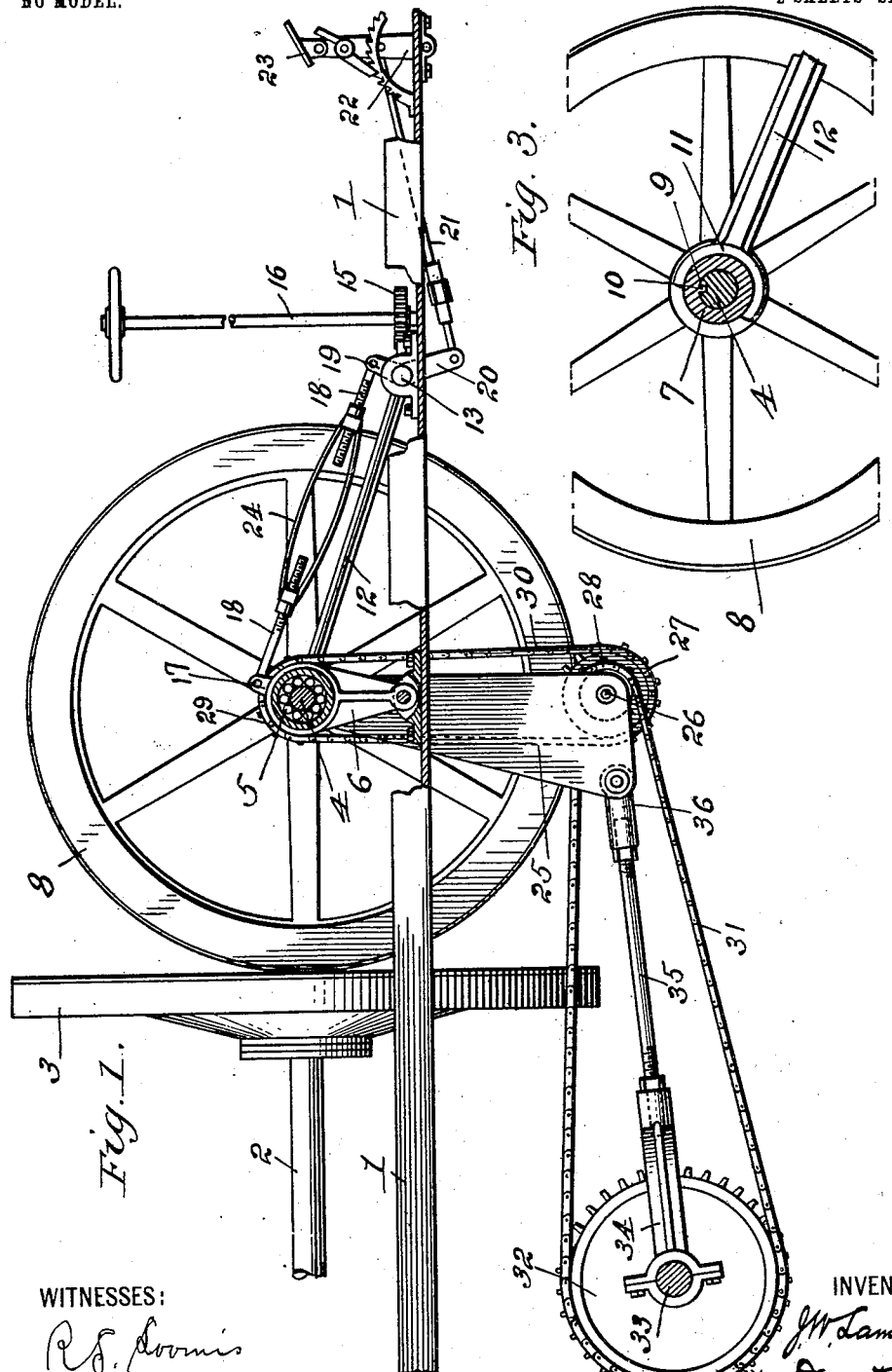

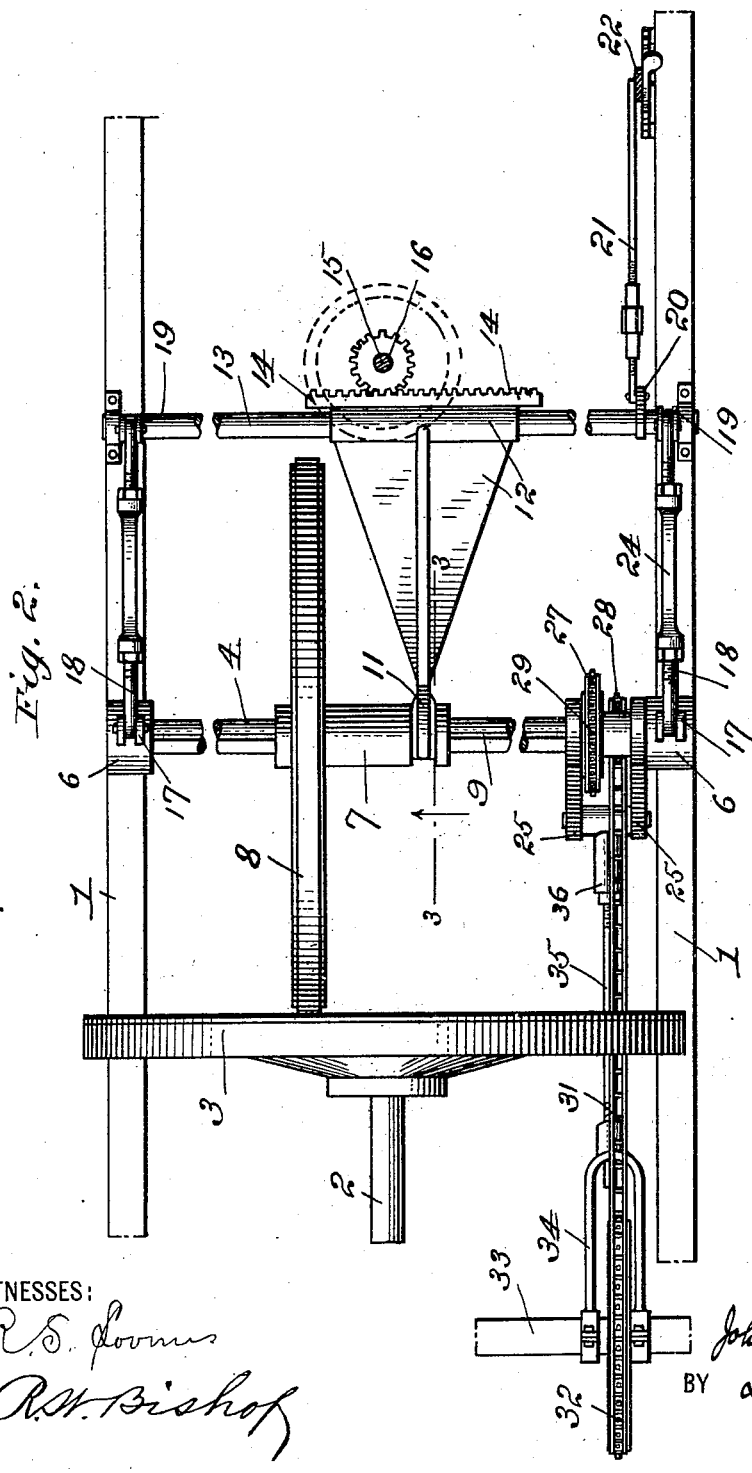

No. 730,930. Patented June 16, 1903.

UNITED STATES PATENT OFFICE.

JOHN W. LAMBERT, OF ANDERSON, INDIANA, ASSIGNOR TO UNION AUTOMOBILE CO., OF UNION CITY, INDIANA.

TRANSMISSION-GEAR FOR AUTOMOBILES.

SPECIFICATION forming part of Letters Patent No. 730,930, dated June 16, 1903.

Application filed October 9, 1902. Serial No. 126,564. (No model.)

*To all whom it may concern:*

Be it known that I, JOHN W. LAMBERT, a citizen of the United States, residing at Anderson, county of Madison, State of Indiana, have invented certain new and useful Improvements in Transmission-Gears for Automobiles, of which the following is a specification, reference being had therein to the accompanying drawings, in which—

Figure 1 is a side elevation of a portion of the main frame, showing the mechanism mounted thereon, the rear axle being in section; Fig. 2, a plan view of the mechanism and frame shown in Fig. 1, and Fig. 3 a detail sectional view taken on the line 3 3 of Fig. 2.

One of the objects of this invention is to provide a frictional transmission or driving mechanism adapted for use on automobiles and by means of which the speed of the vehicle may be increased, diminished, or reversed, as desired, by simply releasing the pressure between the two members of the frictional driving-gear.

Another object of the invention is to provide means for preventing the drive-chains, which connect the shaft of the driven member of the friction-gear with the rear axle, from slackening during the movement of said driven member toward and from the driving member and during the vibrations of the parts of the machine.

Other and equally important advantages are possessed by this invention, as will appear hereinafter.

Referring to the various parts by numerals, 1 designates the side bars of the frame which supports the driving mechanism and which is mounted on the axles of the transporting-wheels. The engine (not shown) is supported on this frame 1 in such a position that its main driving-shaft 2 is above the frame and extends longitudinally thereof midway between the side bars, and mounted on the rear end of this shaft is a large friction-disk 3, which constitutes the driving member of a friction driving-gear. Forward of this friction-disk above the frame is arranged a transverse shaft 4, whose ends are mounted in ball-bearings 5, secured in the upper ends of vertical standards 6. These standards are pivoted at their lower ends in suitable boxes mounted on the side bars of the frame. Mounted to slide on this shaft is a sleeve 7, which carries the friction wheel or disk 8, whose periphery is formed of suitable frictional material and is adapted to bear against the face of the driving-disk 3. When the frictional disks are in driving contact, the centers of the engine-shaft and the transverse shaft 4 are in the same horizontal plane. When the standards 6 are swung forward to separate the two members of the friction-gear, the center of the shaft 4 will be slightly below the center of the engine-shaft. The shaft 4 is formed with the groove 9, in which fits a splint 10, carried by the sleeve 7. To move the sleeve laterally on the shaft 4, an annular groove is formed therein, and in said groove is fitted a yoke 11. This yoke is carried by a slide 12, which is mounted on a transverse rock-shaft 13, supported at its ends in bearings secured to the frame 1. Secured to the front of this slide or formed integral therewith is a rack 14, with which is engaged a pinion 15, mounted on the lower end of a vertical shaft 16, a suitable hand-wheel or similar device being secured to the upper end thereof. To vary the speed of the driven disk 8, the pinion 15 is rotated to move the slide 12, and thereby shift the sleeve on the shaft 4. As the driven friction-disk is carried by this sleeve, the speed of the rotation of this disk will be varied as the slide is moved. By shifting said slide to bring the point of contact between the two friction-disks toward the center of the driving-disk the speed of the driven disk will be reduced and will finally cease when said point of contact is at the center of said driving-disk. By shifting said point of contact toward the periphery of the driving-disk the speed will increase, and by shifting it from one side of the center of the driving-disk to the other the direction of rotation of the driven disk will be reversed. It will therefore be seen that the speed of the vehicle can be varied or reversed or the vehicle stopped by gently releasing the pressure between the parts of the friction driving means and without shifting any clutch mechanism. This is of great advantage, as it relieves the engine of shocks and strains resulting from suddenly releasing the engine of its load or suddenly throwing the whole load thereon.

Suitable mechanism is provided for swinging the standards forward and rearward to separate the friction-disks or to bring them into contact with each other. On the top of each of these standards is formed a short upward and slightly forward extending arm 17, to the upper end of which is pivotally secured the rear end of a forward-extending bar 18. The forward end of each of these bars is connected to an upward-extending arm 19, formed on the rock-shaft 13. On this shaft 13, near one end thereof, is formed a downward-extending arm 20, to the lower end of which is connected one end of a rod 21. The forward end of this rod is connected to a foot-lever 22, which is pivoted at its lower end on the frame 1, its upper end being provided with a foot-piece 23. The rod 18 is formed in two sections, said sections being adjustably connected together by means of a turnbuckle 24 in order that said rod may be lengthened or shortened, as desired. It will thus be observed that by forcing the foot-lever 22 forward and downward the standards 6 will be swung rearward and the periphery of the friction-disk 8 forced against the face of the driving friction-disk 3. Any suitable ratchet-and-pawl or other device may be employed to hold the foot-lever in any desired position. In order that the friction-disk 8 may be brought into proper relation with the disk 3, the rod 18 is made adjustable, as described, so that by lengthening and shortening said rod the disk 8 may be swung toward or from the disk 3 independently of the movement of the rock-shaft 13 or the foot-lever 22, and in this way the proper operative positions of these parts be secured. By providing this mechanism for quickly shifting the disk 8 into and out of contact with the disk 3 it is possible to stop the vehicle without the necessity of laterally moving the disk 8 to the center of the disk 3, and thereby makes it possible to suddenly check the speed of the vehicle whenever that may be desired. It is also an advantage in that when the vehicle is stopped for a considerable period and it is not desired to stop the engine the disks may be separated in order to relieve them of unnecessary wear.

The rear axle of the vehicle is driven from the shaft 4 by means of a chain-and-sprocket driving means which is so arranged that while all of the shafts may change their relative positions the distance between the centers of the said shafts will remain fixed, so that the driving-chains will at all times be in proper condition for transmitting power to the best advantage, all sudden slackening or tightening of the chains by reason of the shifting in the positions of the shafts being avoided. On the shaft 4, near one end thereof, is a pair of links 25, said links being separated a suitable distance and carrying at their lower ends a transverse shaft 26, on which is mounted a large sprocket-wheel 27 and a smaller sprocket-wheel 28. On the shaft 4 between the links 25 is rigidly secured a small sprocket-wheel 29, which is connected by a sprocket-chain 30 to the sprocket-wheel 27. The sprocket-wheel 28 is connected by the sprocket-chain 31 to a sprocket-wheel 32, rigidly mounted on the rear axle 33 of the vehicle. To maintain the shaft 26 at a fixed distance from the rear axle 33, a yoke 34 is mounted on the rear axle, the sprocket-wheel 32 extending between the arms of said yoke. This yoke is connected at its forward end to the lower ends of the links 25 by a rigid bar 35, which is threaded into the forward end of the yoke and into the rear end of a socket-piece 36, whose forward end fits between the links 25 at their lower ends and is pivotally connected thereto. The bar 35 is provided with suitable lock-nuts and is threaded in opposite directions at its ends in order that the distance between the shaft 26 and the axle 33 may be slightly varied to adjust the driving-chain to secure the best results.

It will be noted that while the links 25 may be swung on the shaft 4 the shaft 26 will always be held at a fixed distance from the shaft 4, and that therefore the driving-chain 30 will not be slackened or tightened at any time. It will also be noted that while the axle 33 and the main frame may change their positions with respect to each other and the distance between the axle 33 and the shaft 4 be shortened or lengthened the distance between the axle 33 and the shaft 26 is fixed and that the chain 31 will remain in the same condition no matter what the movement of these various parts. It will thus be seen that the requisite flexibility is obtained in the driving mechanism, while at the same time maintaining the driving-chains in condition to transmit power to the greatest advantage, all sudden slackening or tightening of the chains by reason of the variation in the position of the axle 33 or the shifting of the shaft 4 being avoided.

Having thus described my invention, what I claim as new, and desire to secure by Letters Patent, is—

1. The combination of a frictional driving member, a frictional driven member mounted on a shaft, movable bearings for said shaft, a rock-shaft, adjustable bars connecting said rock-shaft to the movable bearings whereby the relative positions of the rock-shaft and the shaft of the driven member may be shifted to secure the proper relative positions of the two driving members, a foot-lever, a bar connecting said lever to the rock-shaft whereby the driven member may be forced against the driving member, a depending rigid link supported on the shaft of the driven member, a pair of sprocket-wheels mounted in the lower end of this link, a driving-chain connecting one of these sprocket-wheels to the shaft of the driven member, a driving means connecting the other sprocket-wheel with the axle of the vehicle, and means for preventing any forward or rearward movement of the link at its lower end.

2. In a transmission-gear for automobiles, the combination of a frictional driving member, a frictional driven member, a shaft for said driven member, a pair of standards supporting said shaft and pivoted at their lower ends, a rock-shaft, means for connecting said rock-shaft to the standards, a slide mounted on said rock-shaft and loosely connected to the driven member whereby the driven member may be moved along its shaft, a rack formed on said slide, a pinion engaging said rack, means for rotating said pinion, means for moving the rock-shaft, a depending rigid link supported on the shaft of the driven member, a pair of sprocket-wheels mounted in the lower end of this link, a drive-chain connecting one of these sprocket-wheels to the shaft of the driven member, a driving means connecting the other sprocket-wheel with the axle of the vehicle, and means for preventing any forward or rearward movement of the link at its lower end.

3. In a transmission-gear for automobiles, the combination of a frictional driving member, a frictional driven member, a shaft for this latter member, movable bearings supporting said shaft, means for moving said bearings to shift the driven member into and out of contact with the driving member, means for moving the driven member laterally on its shaft, a depending rigid link supported on the shaft of the driven member, a pair of sprocket-wheels mounted in the lower end of this link, a drive-chain connecting one of these sprocket-wheels to the shaft of the driven member, a sprocket-wheel on the axle of the vehicle, a sprocket-chain connecting said sprocket-wheel to one of the sprocket-wheels carried by the link, and a rigid bar connecting the axle carrying the sprocket-wheel pivotally to the lower end of the link.

4. In a transmission-gear for automobiles, the combination of a driving member, a driven member, a shaft for the latter member, movable bearings supporting said shaft, means for moving said bearings to shift the driven member into and out of contact with the driving member, a depending rigid link supported on the shaft of the driven member, a pair of sprocket-wheels mounted in the lower end of this link, a drive-chain connecting one of these sprocket-wheels to the shaft of the driven member, a driving means connecting the other sprocket-wheel with the axle of the vehicle, and means for preventing any forward and rearward movement of the link at its lower end.

5. In a transmission-gear for automobiles, the combination of a driving member, a driven member, a shaft for the latter member, movable bearings supporting said shaft, means for moving said bearings to shift the driven member into and out of contact with the driving member, a depending rigid link mounted to swing at its upper end with the shaft of the driven member, a pair of sprocket-wheels mounted in the lower end of this link, a drive-chain connecting one of these sprocket-wheels to the shaft of the driven member, a driving means connecting the other sprocket-wheel with the axle of the vehicle, and means for preventing any forward or rearward movement of the link at its lower end.

In testimony whereof I hereunto affix my signature, in the presence of two witnesses, this 6th day of October, 1902.

JOHN W. LAMBERT.

Witnesses:
JAMES F. BOLEN,
E. W. LONGANECKER.